United States Patent
Gretz

(10) Patent No.: US 7,882,886 B1
(45) Date of Patent: Feb. 8, 2011

(54) CORING SYSTEM AND METHOD FOR MANUFACTURING A ONE-PIECE DIE CAST ELECTRICAL CONNECTOR BODY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 524 days.

(21) Appl. No.: 12/080,482

(22) Filed: Apr. 3, 2008

(51) Int. Cl.
*B22D 33/04* (2006.01)
*H02G 3/18* (2006.01)

(52) U.S. Cl. .................. 164/137; 164/340; 164/368; 164/369; 174/655; 174/65 R

(58) Field of Classification Search .................. 164/137, 164/340, 368, 369, 370; 174/650, 655, 666; 174/65 R, 70 R; 264/334, 635; 425/466–468
See application file for complete search history.

(56) References Cited

U.S. PATENT DOCUMENTS

| | | | |
|---|---|---|---|
| 4,902,242 A | 2/1990 | Davis et al. | |
| 6,135,818 A | 10/2000 | Lang et al. | |
| 6,857,462 B2 | 2/2005 | Sasaoka et al. | |
| 6,935,221 B2 | 8/2005 | Namy, II et al. | |
| 7,151,223 B2 * | 12/2006 | Auray et al. | 174/70 R |
| 2006/0180331 A1 * | 8/2006 | Auray et al. | 174/44 |
| 2007/0221359 A1 * | 9/2007 | Reilly | 164/516 |

* cited by examiner

*Primary Examiner*—Jessica L Ward
*Assistant Examiner*—Kevin E Yoon

(57) ABSTRACT

A coring system for producing a flash-free one-piece die-cast body for an electrical connector. The electrical connector of produced by the coring system of the present invention may be used for securing two electrical cables to an electrical panel or electrical box through a single knockout hole. The coring system includes a first core, a second core, and a connecting arrangement for connecting the first and second cores in such a manner that there are no gaps between the joined portions of the two cores. When the cores of the coring system are joined together by the connecting arrangement and placed in a mold, molten metal may be introduced to the mold at the joined area of the two core pieces to form a one-piece flash-free connector body according to the present invention.

13 Claims, 9 Drawing Sheets

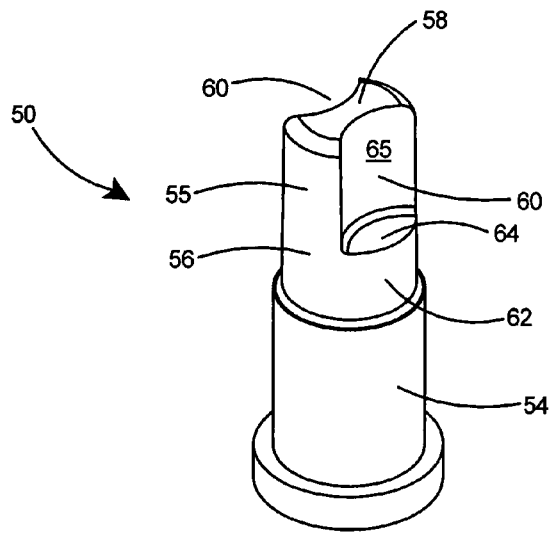
Fig. 5
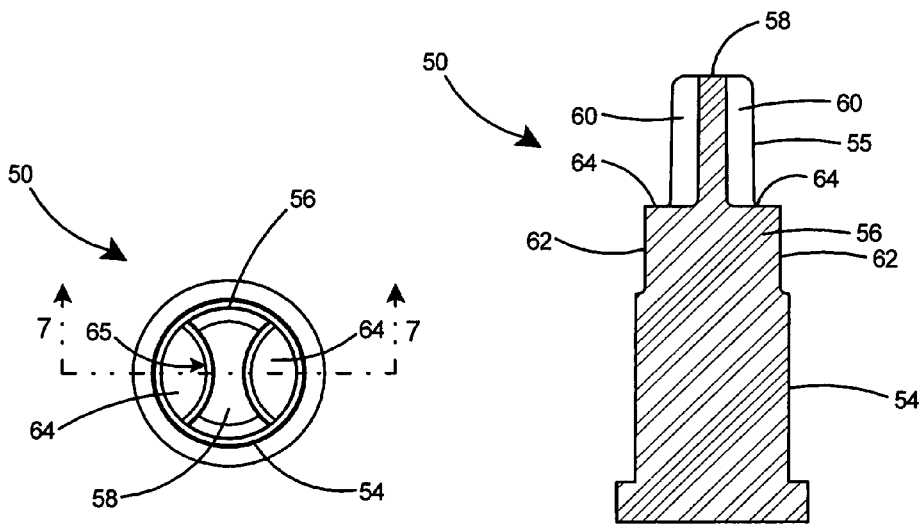
Fig. 6
Fig. 7

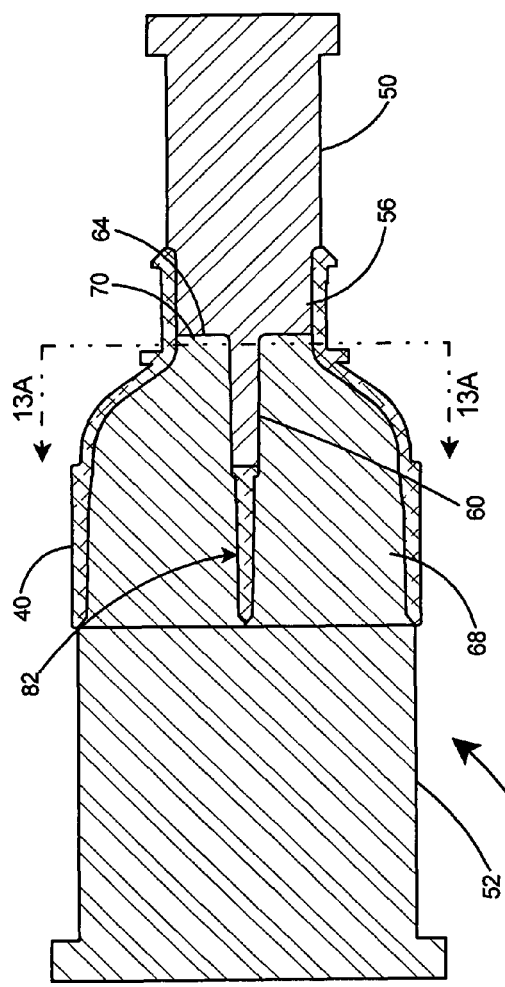
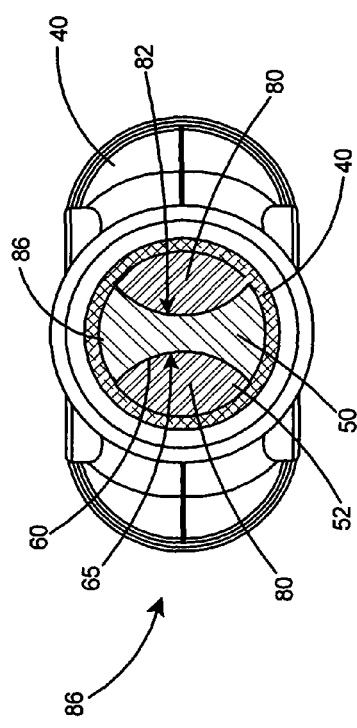
Fig. 13
Fig. 13A

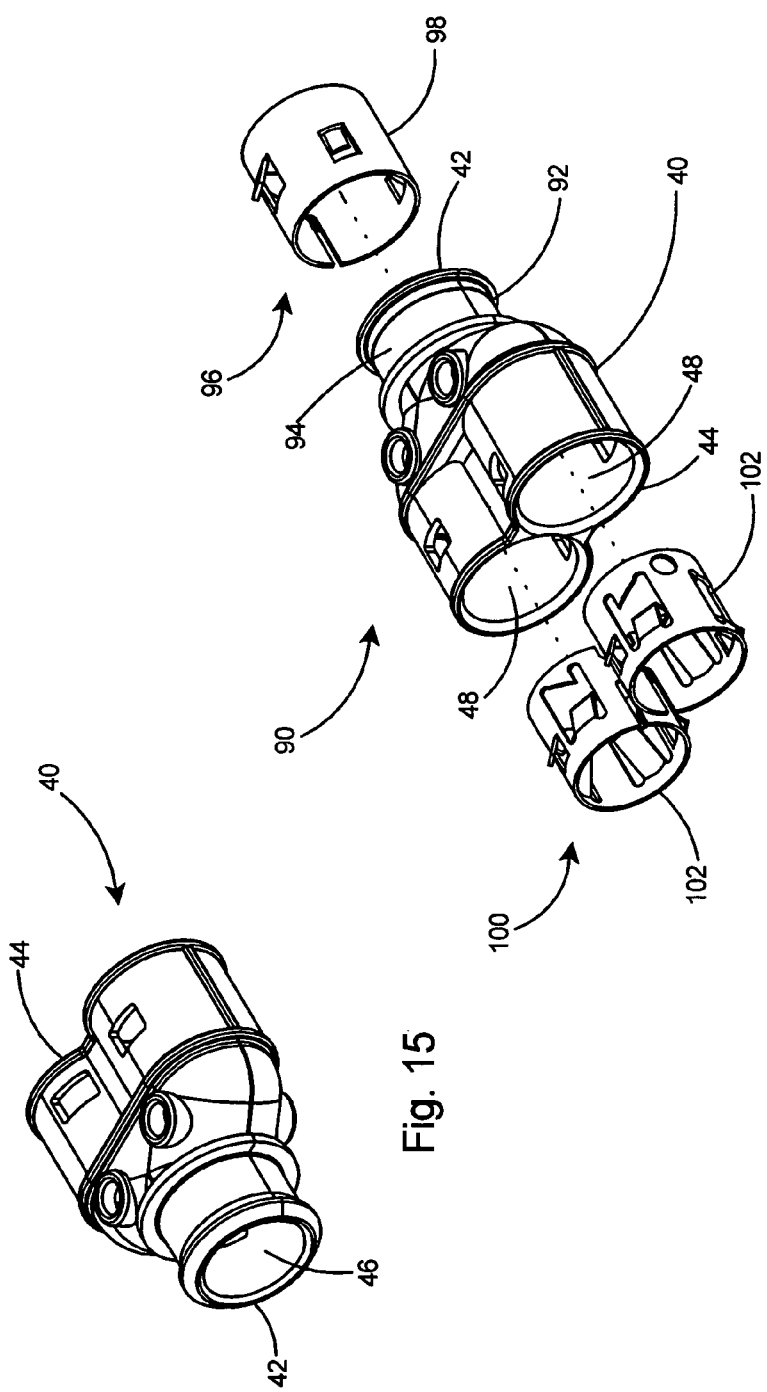

CORING SYSTEM AND METHOD FOR MANUFACTURING A ONE-PIECE DIE CAST ELECTRICAL CONNECTOR BODY

FIELD OF THE INVENTION

This invention relates to system for producing an electrical fitting and specifically to a method for producing an electrical fitting for connecting two electrical cables to a panel or an electrical box.

BACKGROUND OF THE INVENTION

Several prior art electrical connectors have been proposed for attaching a pair of electrical cables to a panel or an electrical box. These prior art electrical connectors 20 typically comprise at least two-pieces including, as shown in FIGS. 1 and 2, a leading body portion 22 and a trailing body portion 24 connected by a screw 26 or similar fastener. The leading body portion 22 and trailing body portion 24 are secured together to form an electrical connector body 20 having a leading end 28 with a single bore 30 therein and a trailing end 32 with two bores 34 therein. The prior art electrical connector 20 facilitates the connection of two electrical cables (not shown) to a knockout hole in a panel or electrical box by securing one cable into each of the bores 34 and connecting the leading end 28 into the panel or electrical box. The electrical cables are secured to the trailing end of the connector body and wiring from the cables routed through the bore 30 in the leading end 28 and into the panel or the electrical box (not shown). Several of these prior art electrical connector bodies, which are comprised of at least two pieces, are shown in U.S. Pat. Nos. 6,355,884, 6,521,831, 7,304,251, and 7,329,144 which are commonly owned by the owner of this application and which are incorporated herein into this disclosure in their entireties by reference thereto.

Typically the prior art connectors as shown in FIGS. 1 and 2 are constructed of metal and the leading and trailing body portions are each manufactured in a die-cast molding operation. Die-casting the leading and trailing body portions therefore required the production of a core and a separate die-cast molding for each part. After each body portion was die cast, several secondary operations were required to fit the leading and trailing body portions together and secure them with the fastener. Prior art electrical fittings of the type accepting two cables for connection through a single aperture in a panel or electrical box therefore were complex to produce, requiring several separate body portions to form the connector body and several secondary operations to connect the separate body portions into a single connector body.

What is needed therefore is a simpler system for producing an electrical fitting of the type described herein, for connecting two cables to a single knockout hole in a panel or electrical box. The system should be capable of producing a one-piece connector body that eliminates several secondary operations, including securing the two body portions together to form the connector body. Elimination of secondary operations substantially decreases the complexity and cost of the connector body.

SUMMARY OF THE INVENTION

The invention is a coring system for producing a flash-free one-piece die-cast body for an electrical connector. The electrical connector of produced by the coring system of the present invention may be used for securing two electrical cables to an electrical panel or electrical box through a single knockout hole. The coring system includes a first core, a second core, and a connecting arrangement for connecting the first and second cores in such a manner that there are no gaps between the joined portions of the two cores. When the cores of the coring system are joined together by the connecting arrangement and placed in a mold, molten metal may be introduced to the mold at the joined area of the two core pieces to form a one-piece flash-free connector body according to the present invention.

OBJECTS AND ADVANTAGES

Several advantages are achieved with the coring system of the present invention, including:
(1) The coring system vastly simplifies the manufacture of a connector body as it enables the connector body to be die cast in one piece rather than in two separate pieces such as in prior art connector bodies.
(2) By eliminating the necessity to mold separated body portions, the coring system eliminates the possibility of flash being produced in the interior of the fitting. Flash is an undesirable byproduct of the die casting process that is detrimental to the operation of a connector body as it is sharp-edged and can cut electrical cables that are later inserted into the connector body.
(3) By eliminating flash, the present invention eliminates a costly chamfering operation to remove the flash.
(4) Several secondary operations, including the securing together of two separate parts to form the connector body, are eliminated.
(5) The entire connector body is produced in a single molding operation, rather than two separate molding operations as in prior art connector bodies.
(6) Much less tooling is required to produce the connector body of the present invention.
(7) The connector body may be die cast with much thinner walls than prior art two piece connector bodies.
(8) Significantly fewer raw materials, such as zinc or similar die-cast cast metals, is consumed.
(9) As a result of casting the connector body in one piece, better electrical continuity is achieved throughout the electrical connector or fitting.

These and other objects and advantages of the present invention will be better understood by reading the following description along with reference to the drawings.

DESCRIPTION OF THE DRAWINGS

FIG. 5 is a perspective view of the first and second cores joined together.

FIG. 6 is a perspective view of the first and second cores with a one-piece connector body formed at the joined areas of the two core pieces.

FIG. 7 is a perspective view of a first core according to the present invention.

FIG. 13 is sectional view of the joined cores and connector body taken along line 13-13 of the connected cores in the center drawing of FIG. 14.

FIG. 13A is sectional view of the joined cores and connector body taken along line 13A-13A of FIG. 13.

FIG. 15 is a perspective view from the leading end of a one-piece connector body produced by the coring system of the present invention.

FIG. 16 is an exploded perspective view depicting a one-piece connector body produced by the coring system of the present invention and with two cable retaining split rings in alignment to be inserted in the bores in the trailing end and a split ring in alignment to be inserted on the leading end of the connector body.

INDEX TO REFERENCE NUMERALS IN DRAWINGS

Figure 1:
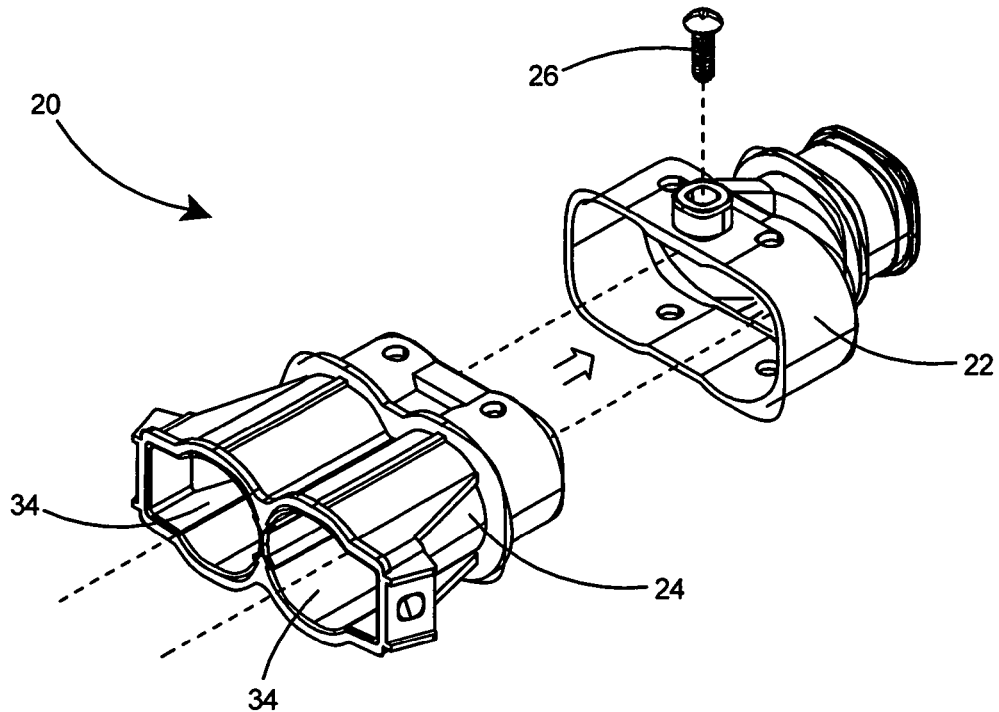
FIG. 1 is an exploded perspective view from the trailing end of a prior art two-piece connector body.
Figure 2:
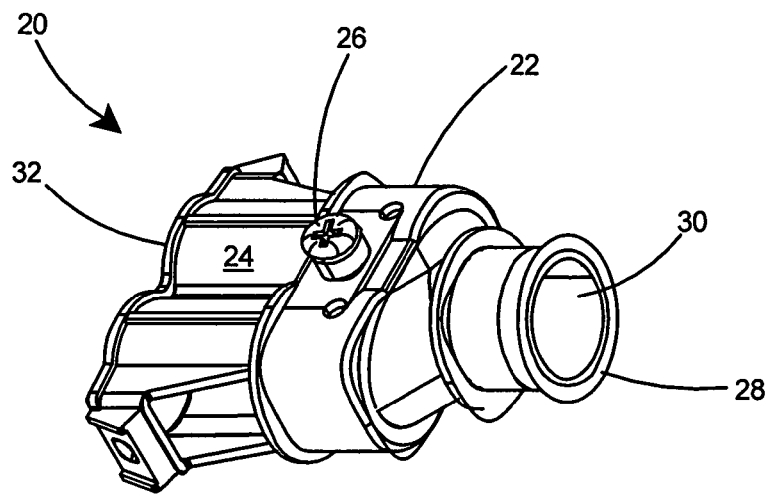
FIG. 2 is a perspective view from the leading end of a prior art two-piece connector body.

20 prior art electrical connector
22 leading body portion
24 trailing body portion
26 screw
28 leading end
30 bore in leading end
32 trailing end
34 trailing bore
40 one-piece connector body, preferred embodiment
42 leading end
44 trailing end
46 leading bore
48 trailing bore
50 first core
52 second core
54 base portion of first core
55 narrowed end portion
56 nose portion
58 end of nose portion
60 groove
62 opposing sides
64 shoulder
65 arcuate bottom surface of groove
66 base portion of second core
68 finger
70 end
72 ledge
74 open channel
76 end portion of finger
78 arcuate shoulder
80 tip portion
82 arcuate inner surface
84 arcuate outer surface
86 coring system
88 connecting arrangement
90 electrical connector
92 nose portion
94 cylindrical seat
96 fastening arrangement
98 split ring
100 cable retaining arrangement
102 cable retaining split ring
104 die cast molding process
106 left hand die
108 right hand die
110 stripper plate
112 aperture
114 mold cavity
116 first end of cavity
118 second end of cavity

DETAILED DESCRIPTION OF THE INVENTION

Figure 3:
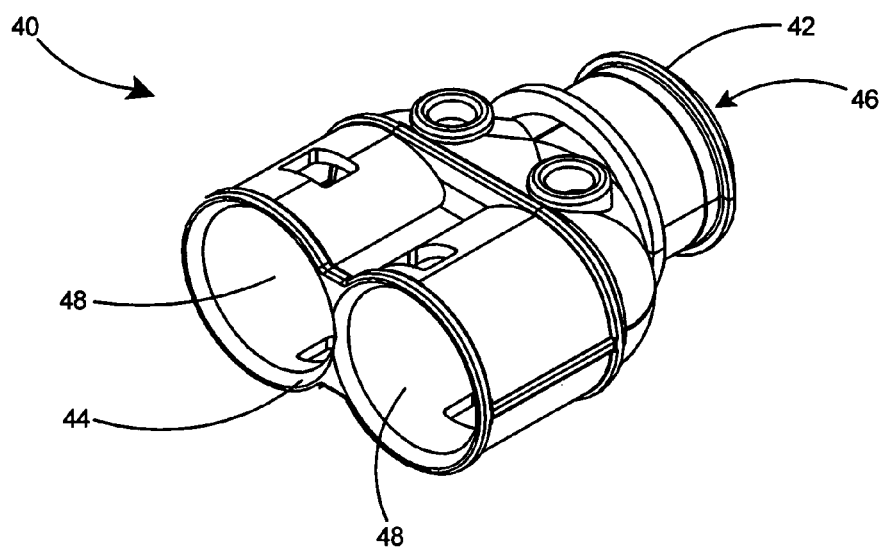
FIG. 3 is a perspective view from the trailing end of a one-piece connector body produced by the coring system of the present invention.

With reference to FIG. 3 there is shown a preferred embodiment of a one-piece flash-free connector body 40 for securing electrical cables to a panel (not shown). The connector body 40 is produced by the coring system of the present invention. The connector body 40 includes a leading end 42, a trailing end 44, a single bore 46 in the leading end 42, and two bores 48 in the trailing end 44.

Figure 4:
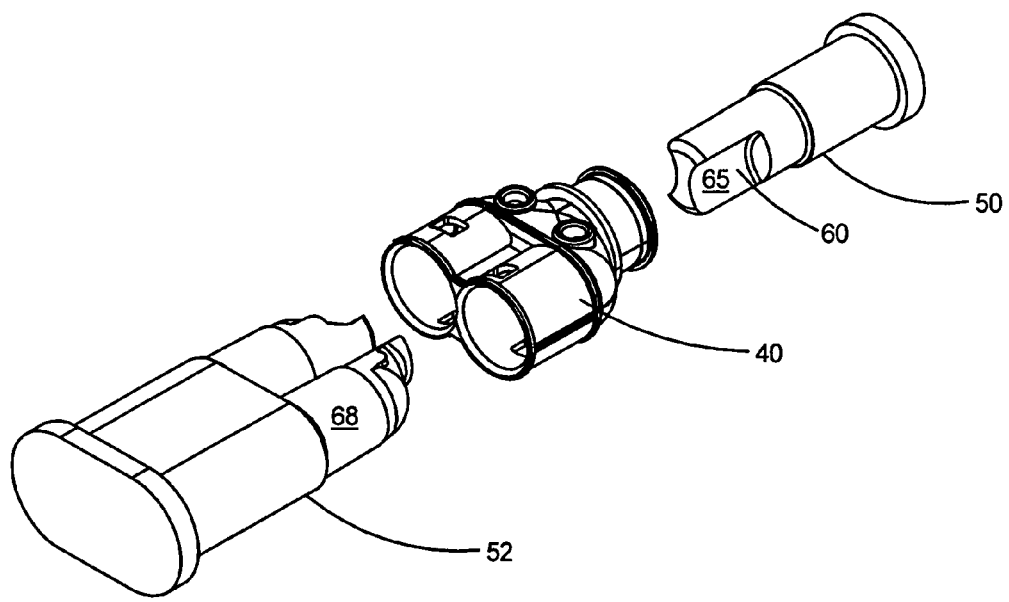
FIG. 4 is an exploded perspective view of the coring system of the present invention and a connector body produced by the coring system.

Referring to FIG. 4, the one-piece connector body 40 is produced in a die cast molding process using two cores including a first core 50 and a second core 52. Prior to applicant's invention, electrical connector bodies for connecting two electrical cables to a single knockout hole in a panel or an electrical box were constructed of two pieces, each typically produced in a separate die cast mold using a single core for each mold. FIG. 4 depicts the cores 50 and 52 after being pulled away from the die cast connector body 40.

With reference to FIGS. 5-7, the first core 50 of the coring system of the present invention includes a base portion 54 with a tubular nose portion 56 extending there from. The nose portion 56 is necked down to a smaller diameter than the base portion 54. The nose portion 56 of the first core 50 includes an end 58 and two grooves 60 on opposing sides 62 of the tubular nose portion 56. The grooves 60 extend from the end 58 toward the base portion 54 providing a narrowed end portion 55 and each groove 60 terminates in a shoulder 64. As shown in FIG. 6, the grooves 60 on the nose portion 56 of the first core 50 include an arcuate bottom surface 65.

Figure 10:
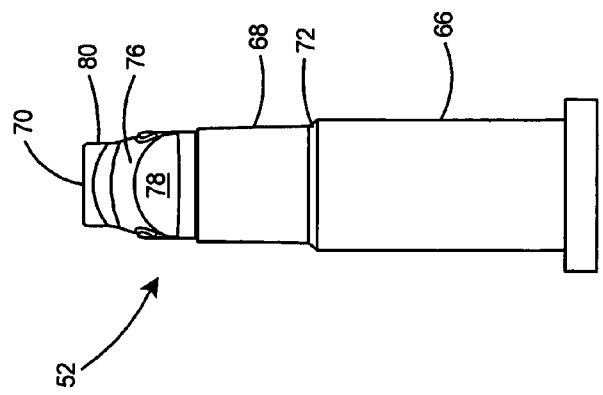
FIG. 10 is a perspective view of a second core according to the present invention.
Figure 9:
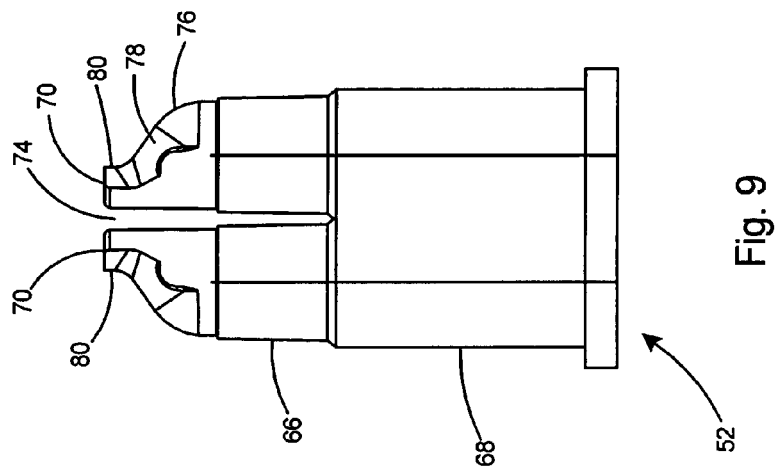
FIG. 9 is a sectional view of the first core taken along line 9-9 of FIG. 8.
Figure 8:
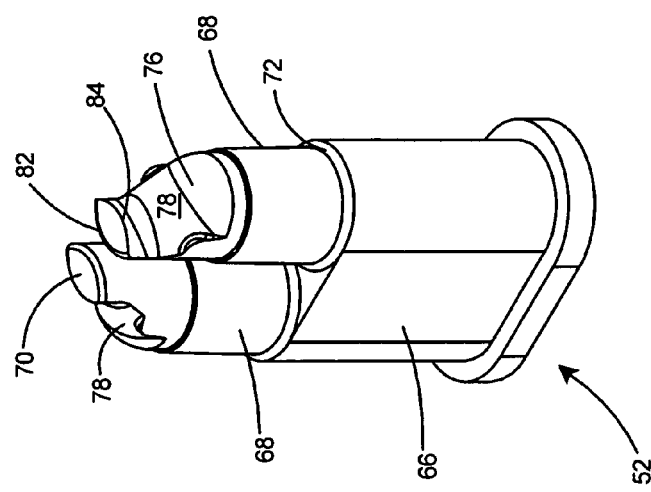
FIG. 8 is a top view of the first core depicted in FIG. 7.

Referring to FIGS. 8-10 there is shown the second core 52 of the coring system of the present invention. The second core 52 includes a base portion 66 and two parallel and generally tubular fingers 68, extending from the base portion 66, with each finger 68 extending to a lens shaped end 70. The tubular fingers 68 are necked down to a smaller overall diameter than the base portion 66 as shown by ledge 72. As shown in FIG. 9, an open channel 74 is provided between the fingers 68. The fingers 68 include end portions 76 thereon that include gradually sloping arcuate shoulders 78. The end portions 76 turn upward near the ends 70 to form tip portions 80. As shown in FIG. 8, tip portions 80 include an arcuate inner surface 82 and an arcuate outer surface 84.

Figure 11:
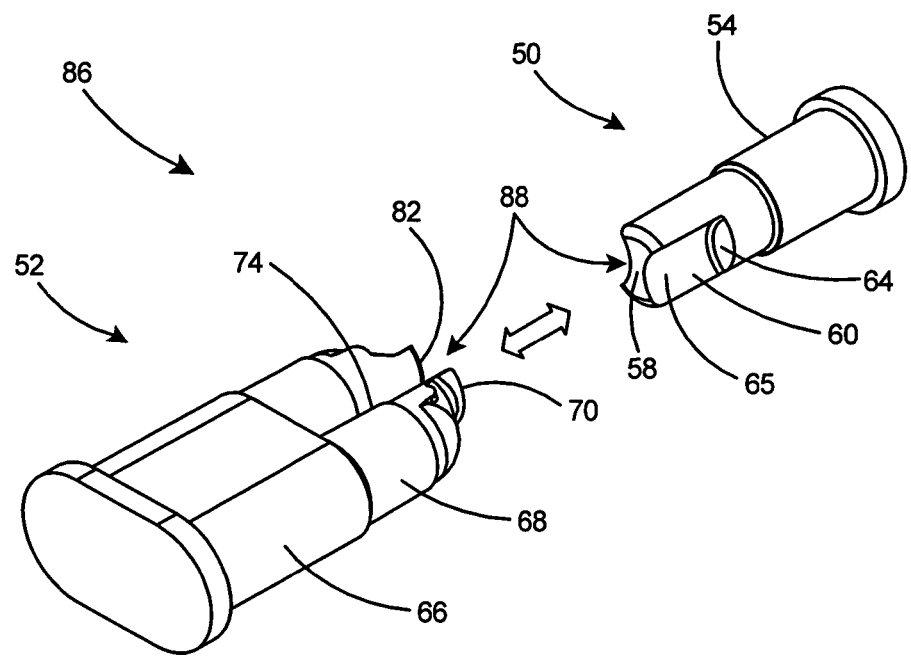
FIG. 11 is a plan view of the second core depicted in FIG. 10.
Figure 12:
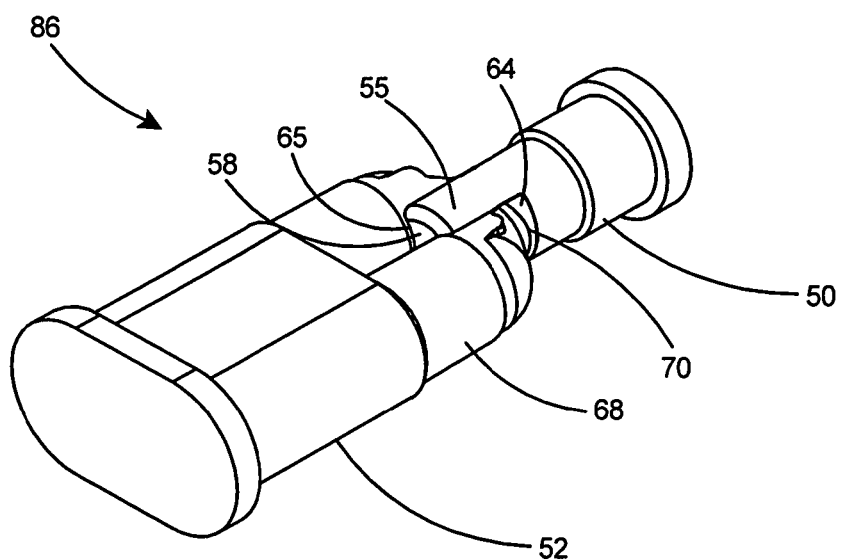
FIG. 12 is a side view of the second core depicted in FIG. 11.

To form the coring system 86 of the present invention, as shown in FIG. 11, the first core 50 and second core 52 are pressed together with the end 58 of the nose portion 56 of the first core 50 inserted into the channel 74 formed by the fingers 68 of the second core 52. The grooves 60 of the first core 50 and the channel 74 of the second core 52 form a connecting arrangement 88 for connecting the first core 50 and the second core 52 together. The cores 50 and 52 are connected in such a manner that the end portions 58 and 70 of each core 50 and 52 respectively, are in contact with each other and there are no gaps between the joined portions of the first core 50 and the second core 52. Forming a gap free connection as shown in FIG. 12 ensures that a connector body molded by the coring system 86 of the present invention will be free of flash which is undesirable excess metal on a die cast part. The design of the first core 50 and second core 52 of the present invention ensures that the two cores will align properly with each other and that the ends 70 of the fingers 68 of the second core 52 will seat flush against the shoulders 64 of the first core 50. The arcuate inner surfaces 82 of the fingers 68 of the second core 52 will also form a tight gap-free fit against the arcuate bottom surface 65 of the grooves 60. When the two cores 50 and 52 are pressed together in a mold they will provide a coring system 86 for forming a flash-free connector body.

Figure 14:
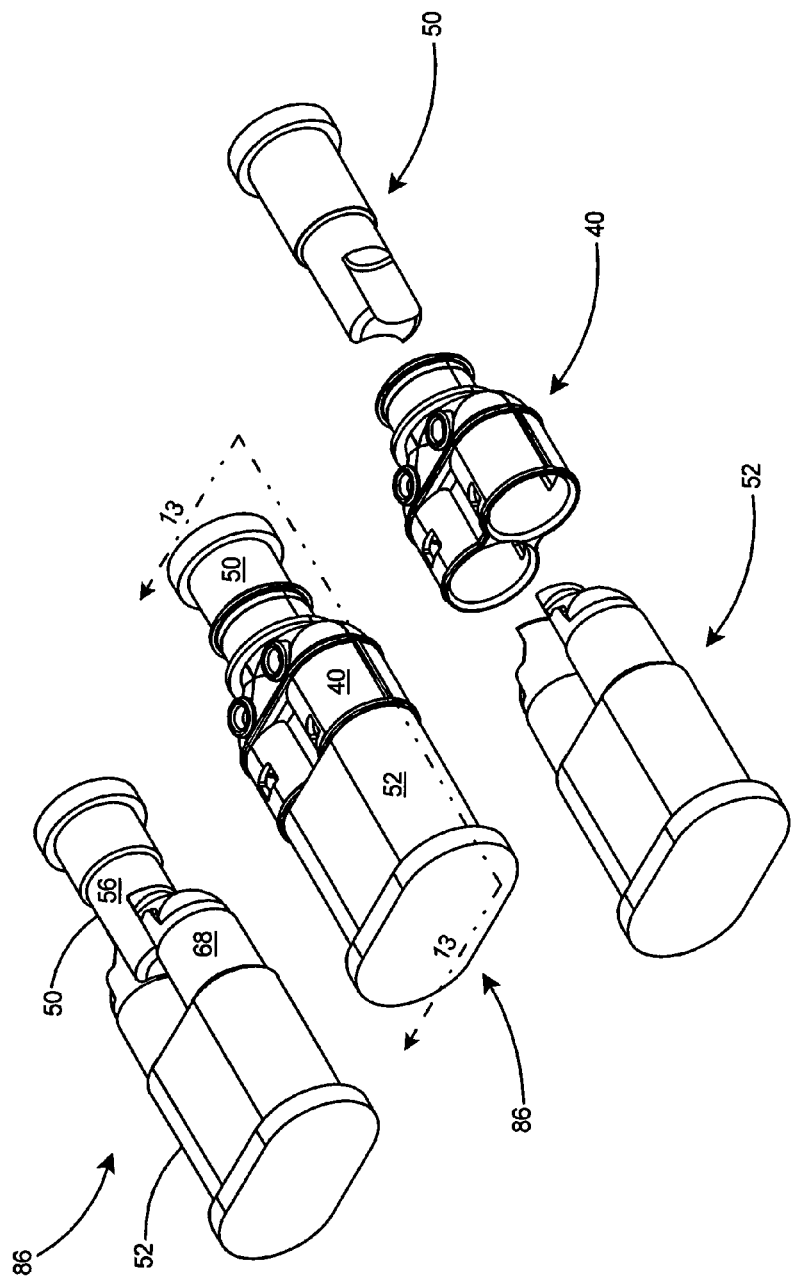
FIG. 14 is a conceptual perspective view of a sequence of steps depicting the forming of a one-piece connector body using the coring system of the present invention.

With reference to FIG. 14 there is shown the coring system 86 of FIG. 11 after a connector body 40 has been formed thereon in a die cast mold (not shown). As shown in the top left portion of FIG. 14, the connector body 40 is formed on the necked down areas of the joined cores including the necked down nose portion 56 of the first core 50 and the necked down fingers 68 of the second core 52.

FIG. 13 is a sectional view taken along line 13-13 of FIG. 14, depicting the die cast connector body 40 formed around the coring system 86 of the present invention. As shown in FIG. 13, there is a tight gap-free connection between the nose portion 56 at the grooves 60 and the arcuate inner surface 82 of the fingers 68. There is also a tight gap-free connection between the ends 70 of the second core 52 and the shoulders 64 of the first core 50. FIG. 13A depicts a cross-sectional view of the coring system 86 taken along line 13A-13A of FIG. 13. The lens shaped tip portions 80 of the second core including the inner arcuate surfaces 82 fit tightly against the arcuate bottoms 65 of the grooves 60.

Referring to FIG. 14 there is shown a conceptual perspective view of a sequence of steps in the forming of a one-piece connector body 40 using the coring system 86 of the present invention. In the top left of the figure, the preferred embodiments of a first core 50 and a second core 52 according to the present invention are pressed together in a mold (not shown). In the center of the figure, the connector body 40 has been formed on the necked down areas of the two cores 50 and 52. At the lower right of the figure, the first core 50 and second core 52 are shown separated from the die cast connector body 40.

With reference to FIG. 15 there is shown a preferred embodiment of a connector body 40 formed in a die cast molding process using the coring system of the present invention. The connector body 40 includes a leading end 42, a trailing end 44, and a leading bore 46 in the leading end 42.

Referring to FIG. 16, the flash free one-piece connector body 40 produced by the coring system of the present invention can be used to form the main body portion of an electrical connector 90. The trailing end 44 of the connector body 40 includes two bores 48 therein. The leading end 42 of the connector body 40 includes an extending nose portion 92 with a cylindrical seat 94 thereon. To form the electrical connector 90, a fastening arrangement 96 such as a split ring 98 is typically placed on the leading end 42 of the connector body 40 for securing the electrical connector 90 to a knockout hole in a panel or an electrical box (not shown). A cable retaining arrangement 100 is included on the trailing end of the connector body 40 for securing two electrical cables (not shown) to the trailing end 44 of the electrical connector 90. In FIG. 16, the cable retaining arrangement 100 includes two cable retaining split rings 102, which are shown in alignment with the bores 48 in the trailing end 44 of the connector body 40 to be inserted therein. Various cable retaining arrangements and fastening arrangements for use with electrical connector bodies are shown in U.S. Pat. Nos. 6,355,884, 6,521,831, 7,304, 251, and 7,329,144 which have been incorporated herein in their entireties by reference thereto.

Figure 17:
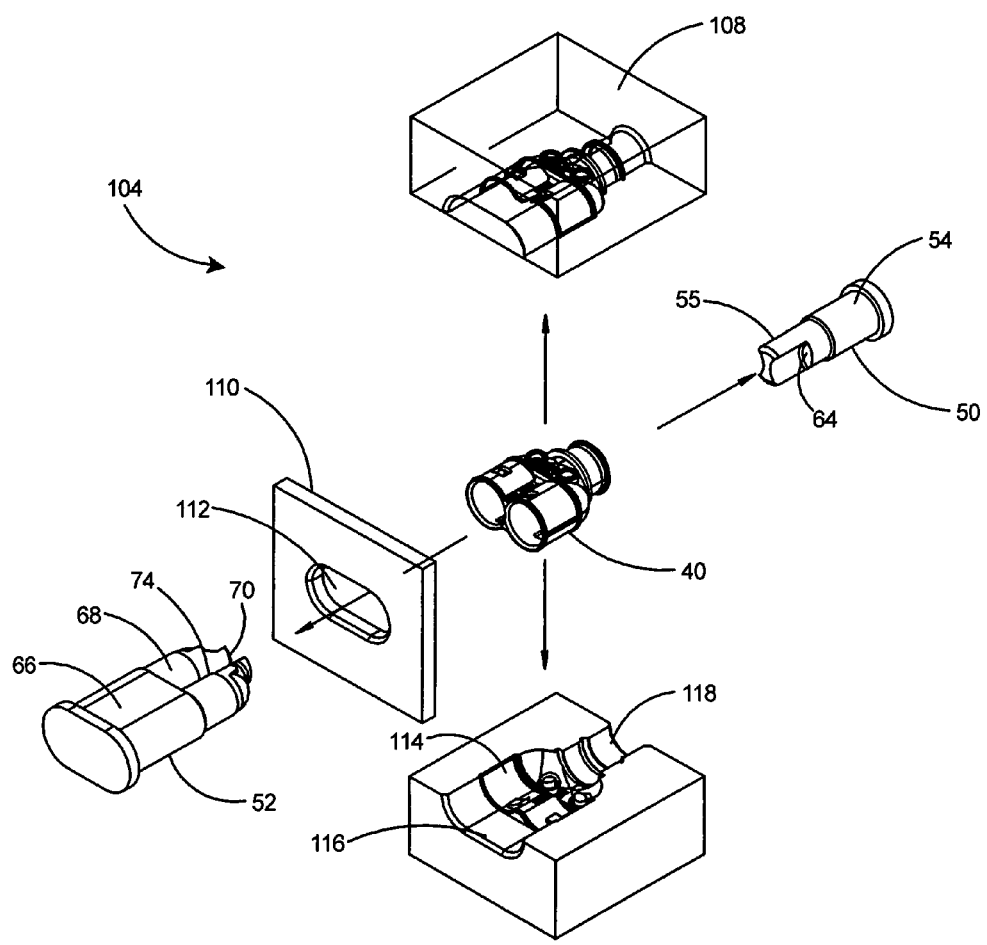
FIG. 17 is a conceptual view depicting the coring system of the present invention including left and right hand dies, a stripper plate, and the first and second cores.

FIG. 17 depicts a die cast molding process 104 including a left hand die 106, a right hand die 108, a stripper plate 110, and the coring system 86 of the present invention including the first core 50, and the second core 52. The coring system of the present invention provides a method of producing a die cast flash free one-piece connector body 40. The method includes connecting the first core 50 and the second core 52 together by extending the narrowed end portion 55 of the first core 50 into the open channel 74 on the second core 52 until the end 70 of the fingers 68 of the second core 52 engage the shoulders 64 on the first core 50. After the cores 50 and 52 are connected, the second core 52 extends through aperture 112 in stripper plate 110. The two core pieces 50 and 52 are held together by the mold machinery (not shown). The left and right hand dies 106 and 108 provide an elongated mold cavity 114 having opposing ends 116 and 118 therein. The joined cores 50 and 52 are placed into the mold cavity 114 in such a manner that the joined cores are longitudinally aligned in the cavity 114 and the base portions 54 and 66 are at the opposing ends 116 and 118 of the elongated cavity 114. With the mold closed and the cores 50 and 52 inserted therein, molten metal is pumped into the mold cavity 114 to form the one-piece connector body 40. After the die cast connector body 40 is formed, the second core 52 is pulled through the stripper plate 110 to eject the one-piece flash-free connector body 40 from the mold cavity 114 and the process is repeated.

Referring to FIG. 4, the fingers 68 of the second core 52 include a radius of curvature equal to the radius of curvature of the arcuate bottom surface 65 of the grooves 60. By matching the radius of curvature of the fingers 68 to the radius of curvature of the bottom surface 65 of the grooves 60, and providing a close tolerance on the first and second cores 50 and 52, a tight fit is obtained when connecting the cores 50 and 52 to form the coring system of the present invention.

Preferably, the first core 50 and the second core 52 are constructed of hardened tool steel and include smooth and burr-free outer surfaces. Most preferably, the first core 50 and the second core 52 are constructed of grade AISI H-13 tool steel with a Rockwell hardness of between 46 and 48.

Preferably the connector body 40 formed by the coring system 86 of the present invention is formed of a die cast alloy. Essentially any die cast alloy may be used to form a connector according to the present invention. Most preferably, the die cast alloy used to form the connector body 40 is Zamak-7. The connector body 40 of the present invention could also be molded of plastic, typically in an injection molding process. Suitable plastics include polyvinyl chloride, polycarbonate, acrylonitrile-butadiene styrene, and polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A coring system for producing a flash free one-piece connector body for securing electrical cables to a panel comprising:

a first core including a base portion with a tubular nose portion extending therefrom, said nose portion including an end thereon;

two grooves on opposing sides of said tubular nose portion of said first core, said grooves forming a narrow end portion, each of said grooves extending from said end toward said base portion and terminating in a shoulder;

a second core including a base portion and two parallel and generally tubular fingers extending from said base portion to an end;

an open channel between said fingers; and said first core and said second core engaged together in such a manner that said narrow end portion of said first core is fully extended into said channel on said second core and said end of said fingers of said second core engage said shoulders on said first core, whereby said engaged cores are capable of being inserted in the cavity of a mold that is capable of being closed and having molten metal or plastic admitted therein into said cavity thereby producing said flash free one-piece connector body.

2. The coring system of claim 1 wherein said grooves on said nose portion of said first core include an arcuate bottom surface.

3. The coring system of claim 2 wherein said fingers include a radius of curvature;

said arcuate bottom surface of said grooves includes a radius of curvature; and said radius of curvature of said fingers matches said radius of curvature of said arcuate bottom surface of said grooves.

4. The coring system of claim 1 wherein said first core and said second core include smooth and bun-free outer surfaces.

5. The coring system of claim 1 wherein said first core and said second core are constructed of hardened tool steel.

6. The coring system of claim 5 wherein said first core and said second core are constructed of grade AISI H-13 tool steel.

7. The coring system of claim 6 wherein said tool steel includes a Rockwell hardness of between 46 and 48.

8. A method of producing a die cast flash free one-piece connector body for securing electrical cables to a panel including the steps of:

providing a first core including a base portion, a tubular nose portion extending from said base portion, an end on said nose portion, a narrow end portion formed by two grooves on opposing sides of said tubular nose portion, and a shoulder at the end of each of said grooves;

providing a second core including a base portion, two parallel and generally tubular fingers extending from said base portion to an end, and an open channel between said fingers;

joining first core and said second core into joined cores by extending said narrow end portion of said first core into said channel on said second core until said end of said fingers of said second core engage said shoulders on said first core;

providing a mold including an elongated mold cavity having opposing ends therein;

placing said joined cores into said elongated mold cavity in such a manner that said joined cores are longitudinally aligned in said cavity and said base portions are at said opposing ends of said elongated cavity;

closing said mold; and admitting molding material into said cavity of said mold to form said one-piece connector body.

9. The method of claim 8 wherein said molding material for forming said one-piece connector body is selected from the group including die cast metal alloy and plastic.

10. The method of claim 8 wherein said connector body is constructed of Zamak-7.

11. The method of claim 8 wherein said first core and said second core are constructed of hardened tool steel.

12. The method of claim 11 wherein said first core and said second core are constructed of grade AISI H-13 tool steel.

13. The method of claim 12 wherein said tool steel includes a Rockwell hardness of between 46 and 48.

\* \* \* \* \*